United States Patent Office 3,657,320
Patented Apr. 18, 1972

3,657,320
PERFLUOROALKOXYALKYL-SUBSTITUTED
CARBAMATES
Louis G. Anello, Basking Ridge, and Richard F. Sweeney,
Dover, N.J., assignors to Allied Chemical Corporation,
New York, N.Y.
No Drawing. Filed Nov. 8, 1968, Ser. No. 774,518
Int. Cl. C07c *125/06*
U.S. Cl. 260—471 C
13 Claims

ABSTRACT OF THE DISCLOSURE

Carbamates and dicarbamates of fluorocarbon alcohols characterized by having a polyfluoroisoalkoxyalkyl tail wherein an ether oxygen atom links a fluorinated carbon atom connected to two fluoroalkyl groups and at least one —$CF_2$— group. These compounds are useful to impart oil and water resistance to fabrics, leather, and the like.

This invention relates to novel polyfluoroalkoxyalkyl carbamates and dicarbamates. More particularly, this invention relates to carbamates and dicarbamates having a terminal branched-chain polyfluoroalkoxyalkyl tail.

Numerous fluorine-containing compounds have been suggested in the prior art as treating agents to impart oil and water resistance to various substrates such as fibers and textiles, papers and the like. In general, increasing the amounts of fluorine in such compounds increases the protection afforded to the substrate. However, the expense of compounds containing a high proportion of fluorine to carbon adds materially to the cost of treating these substrates effectively. Further, many treating agents known for fabrics, while effective initially, do not withstand successive washing or cleaning cycles. Thus, the articles treated with such agents must be retreated after one or more washing cycles to restore the desired oil and water repellency.

Accordingly, it is an object of the present invention to provide novel compounds which are effective as oil and water repellents.

It is a further object to provide novel fluorocarbon compounds having a relatively low fluorine to carbon mol ratio which impart excellent oil and water repellency to various substrates.

It is another object to provide oil and water repellents for fabrics that will retain their effectiveness through successive washing cycles.

Further objects will become apparent from the following detailed description thereof.

We have discovered novel fluorocarbon carbamate compounds having the formula (1)
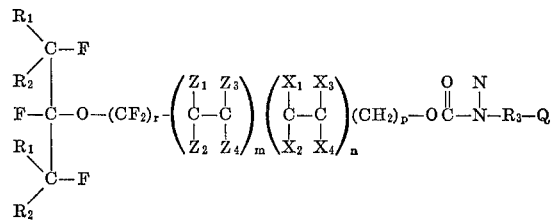

wherein $R_1$ and $R_2$ independently at each occurrence can be fluorine, chlorine, perfluoroalkyl or together can form a cyclic perfluoroalkylene group, with the proviso that both $R_1$ and $R_2$ cannot be chlorine; $Z_1$, $Z_2$, $Z_3$ and $Z_4$ are independently hydrogen, fluorine or chlorine, providing that no more than two of $Z_1$–$Z_4$ are chlorine; $X_1$, $X_2$, $X_3$ and $X_4$ are independently hydrogen, chlorine or fluorine providing that no more than one of $X_1$–$X_4$ is chlorine; $r$ is an integer of 1-2; $m$ and $n$ are integers from 0-75; the sum of $m$ and $n$ is 0-75; $p$ is an integer of 0 or 1 providing that when $p$ is 0, $n$ must be at least one and $X_3$ and $X_4$ must be hydrogen; $R_3$ is an arylene, alkylene or cycloalkylene group which can be unsubstituted or substituted with groups that are inert to isocyanate groups and Q is hydrogen, a radical of the formula

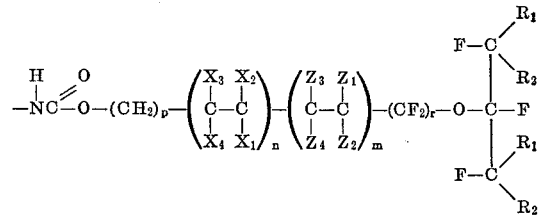

wherein $R_1$ and $R_2$, $Z_1$–$Z_4$, $X_1$–$X_4$, $r$, $m$, $n$, and $p$ have the meanings given above, isocyanate, or carbamate derivatives of an isocyanate group. Preferably, $m$ and $n$ are integers from 0-10. These carbamates and dicarbamates are useful as treating agents to impart excellent oil and water resistance to various substrates, particularly paper, fabrics and leather.

The criticality in the structure of these carbamates is in the fluoroisoalkoxyalkyl tail portion wherein an ether oxygen links a fluorinated carbon atom attached to two fluoroalkyl groups and at least one —$CF_2$— group.

The compounds of the invention can be prepared by reacting a polyfluoroisoalkoxyalkyl alcohol having the formula (2)
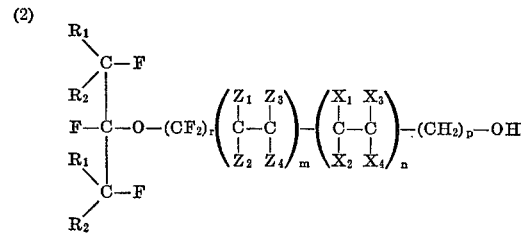

wherein $R_1$, $R_2$, $Z_1$–$Z_4$, $X_1$–$X_4$, $r$, $m$, $n$ and $p$ have the meanings given above with an isocyanate or diisocyanate in the presence of a basic catalyst to form the mono- or di-adduct. Mono-adducts of diisocyanates can be further reacted with acids, amines, alcohols or amides to form their corresponding derivatives.

The alcohols described in Formula 2 above can be prepared from their corresponding polyfluoroisoalkoxy-alkyl iodides. These iodides and their preparation are disclosed in more detail in copending U.S. application Ser. No. 633,359, filed Apr. 25, 1967, now U.S. Pat. 3,514,487. The pertinent details of that application are hereby incorporated by reference. These iodides are prepared by reacting polyfluoroisoalkoxytetrafluoroalkyl iodides of the formula (3)
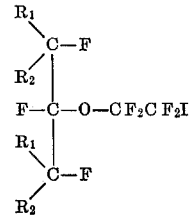

wherein $R_1$ and $R_2$ have the meanings given above, with telomerizable compounds having the formulas $$Z_1Z_2C=CZ_3Z_4$$

and/or $X_1X_2C=CX_3X_4$ wherein $Z_1-Z_4$ and $X_1-X_4$ have the meanings given above. Suitable telomerizable compounds include ethylene, tetrafluoroethylene, chlorodifluoroethylene, difluoroethylene and the like. The telomerization reaction can be initiated by heat, e.g., temperatures from about 100° C. to about 350° C., preferably from about 150 to 200° C., or by a free radical initiator, e.g. azobisisobutyronitrile, benzoyl peroxide and the like.

The polyfluoroisoalkoxytetrafluoroalkyl iodides can be prepared by reacting a corresponding halogenated ketone with an ionizable fluoride salt, e.g. CF or KF, to form a fluorinated organic salt and reacting the organic salt with tetrafluoroethylene and iodine. Preparation of the polyfluoroisoalkoxytetrafluoroalkyl iodides is described in greater detail in co-pending U.S. applications of Litt et al., Ser. Nos. 492,276, filed Oct. 1, 1965, now U.S. Pat. 3,453,333, and 513,574 filed Dec. 13, 1965, now U.S. Pat. 3,470,256. The pertinent subject matter of these applications is hereby incorporated by reference.

The following series of equations will serve to further illustrate the preparation of the polyfluoroisoalkoxyalkyl iodides, wherein $R_1$, $R_2$, $Z_1-Z_4$, $X_1-X_4$, $m$ and $n$ have the meanings given above.

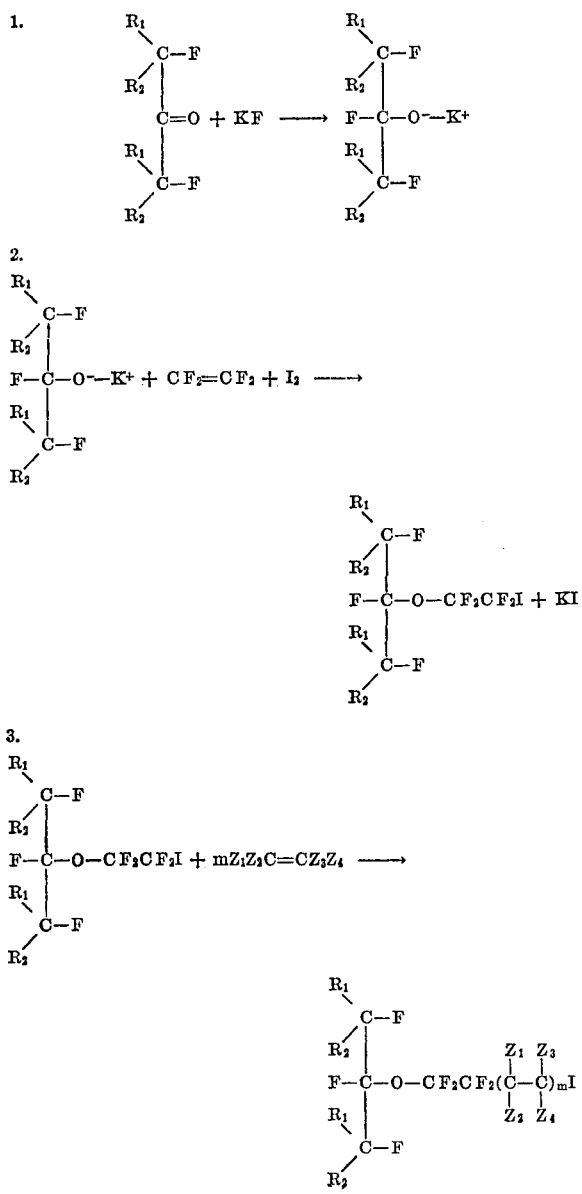

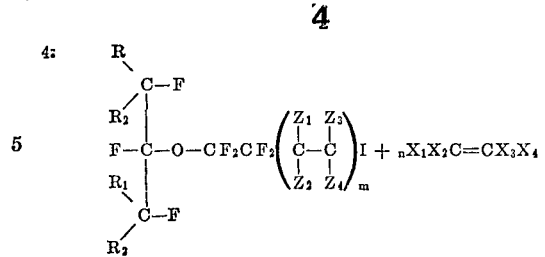

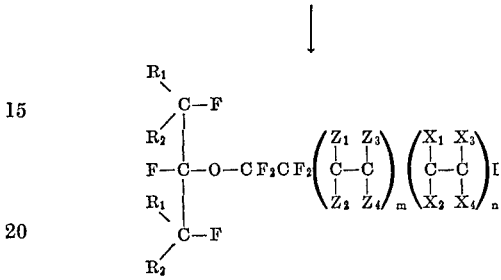

It will be understood that when $m$ and/or $n=0$, the corresponding telomerization Equations 3 and/or 4 are omitted.

The alcohols hereinbefore described can be prepared from the corresponding iodides in various ways. For example, alcohols having at least three terminal —$CH_2$— groups can be prepared by reacting a suitable polyfluoroisoalkoxyalkyl iodide with an unsaturated alcohol having the desired number of carbon atoms to form an iodoalcohol and reducing the iodoalcohol with a mild reducing agent such as lithium aluminum hydride or zinc and alcohol.

The alcohols can also be prepared by reacting a suitable iodide as described above with sulfur trioxide to form the pyrosulfate, or with oleum to form the hydrosulfate and hydrolyzing the pyrosulfate or hydrosulfate to the alcohol with aqueous acid.

These and other telomer alcohols of Formula 2 are described in greater detail in copending U.S. application Ser. No. 721,089 filed Apr. 12, 1968, now abandoned. The pertinent subject matter of that application is hereby incorporated by reference.

A preferred class of alcohols within the scope of the general Formula 2 have the formula

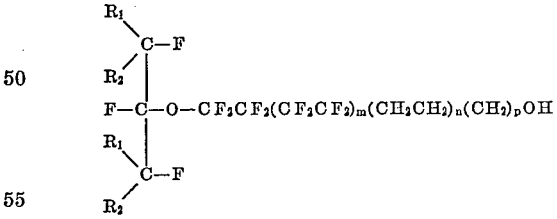

wherein $R_1$ and $R_2$ are independently fluorine or perfluoroalkyl groups of 1 to 2 carbon atoms, $m$ and $n$ are integers from 0–10, and $p$ is 0 or 1.

The reaction between the alcohols as hereinbefore described and an organic isocyanate or diisocyanate is effected by admixing the reactants in the presence of a suitable basic catalyst.

Organic isocyanates useful in preparing the carbamates of the invention are well known and include aromatic, aliphatic and alicyclic isocyanates and diisocyanates which can be variously substituted with one or more substituents which are inert to isocyanate groups. The exact nature of the isocyanate reactant employed is not critical and can be written as

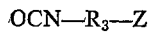

wherein Z is hydrogen or —NCO; and $R_3$ represents arylene, alkylene or cycloalkylene or any of these substituted with one or more substituents. Arylene can be phenylene, biphenylene, or condensed ring arylene such as naphthalene, or anthracene; alkylene can be straight or branched chain alkylene radicals of from 1 to about 20 carbon atoms; cycloalkylene can be cyclopentylene, cyclohexylene and the like. Suitable substituents include lower alkyl, aryl, alkaryl, or aralkyl radicals and halogen atoms such as fluorine, chlorine, bromine or iodine. Suitable isocyanates include, for example, phenyl isocyanate, α-naphthyl isocyanate, ethyl isocyanate, octadecyl isocyanate, isopropyl isocyanate and tolyl isocyanate. Suitable diisocyanates include toluene-2,4-diisocyanate, m-phenylene diisocyanate, 1-ethylbenzene - 2,4 - diisocyanate, 1,6-hexamethylene diisocyanate, 1,10-decamethylene diisocyanate, 1,18-octadecamethylene diisocyanate, 4-chloro-1,3-phenylene diisocyanate, 1,5-naphthalene diisocyanate, 1,4-tetramethylene diisocyanate, 1,4-cyclohexyl diisocyanate, 4,4'-methylene bis(cyclohexyl isocyanate), and the like.

When one mol of fluoroalcohol is reacted with one mol of a diisocyanate, the monoadduct is formed. These compounds contain a reactive isocyanate group which can in turn be reacted with other compounds containing a reactive hydrogen such as acids, alcohols, amines and amide compounds, to form a carbamate group as will be known to one skilled in the art. Suitable reactants include for example long chain hydrocarbon acids and alcohols of about 6 to 18 carbon atoms such as caproic acid, caprylic acid, pelargonic acid, stearic acid and the like; decyl alcohol, tridecyl alcohol, pentadecyl alcohol, octadecyl alcohol and the like; primary and secondary aliphatic amines such as ethyleneimine, n-hexylamine, laurylamine, stearylamine, octadecylamine, urea, and the like; and amides such as stearamide, octadecylamide and the like. They can also react with a substrate to be coated which can explain the excellent adherence to the substrates found for the present compounds and their excellent durability.

Basic catalysts suitable for use in the invention include triethylamine, tributylamine, pyridine and the like.

The products of the invention can be prepared in the presence or absence of an anhydrous solvent. The presence of a solvent will serve to dissipate the heat of reaction. Suitable solvents include halogenated hydrocarbons such as 1,1,1-trichloroethane, trichloroethylene and perchloroethylene and hydrocarbons such as benzene, toluene and xylene. When a solvent is employed it can be dehydrated by using a drying agent or by distilling prior to use in conventional manner.

The temperature of the reaction is not critical and a wide range of temperatures can be employed. When a solvent is employed, the reaction is preferably carried out at or below the reflux temperature of the reaction mixture. In general, suitable temperatures are from about 25 to 200° C.

The invention will be illustrated further by the following examples, but it is to be understood that the invention is not meant to be limited to the details disclosed therein. In the examples all parts are by weight unless otherwise noted.

EXAMPLE 1

4-heptafluoroisopropoxy-3,3,4,4-tetrafluorobutyl iodide (38 parts) having a boiling point of 85–87° C./100 mm. were charged to a vessel fitted with a stirrer, dropping funnel, thermometer and a condenser connected to a trap at −78° C. 28 parts of stabilized sulfur trioxide were added, maintaining the temperature at 35–40° C. Iodine was precipitated. The mixture was heated to 70° C. and held for two hours to complete formation of the pyrosulfate product. The mixture was cooled to room temperature and 100 parts by volume of 35% sulfuric acid were added slowly to hydrolyze the pyrosulfate to the alcohol. A small amount of sodium sulfite was added to remove any elemental iodine and the mixture heated for one hour at 105° C. Two layers formed on standing. The aqueous layer was washed with ether and the extract combined with the organic layer. The organic product was distilled by use of a spinning band column.

A 70% yield of 4-heptafluoroisopropoxy-3,3,4,4-tetrafluorobutanol was recovered having a boiling point of 84° C./59 mm.

*Elemental analysis.*—Calculated for $C_7F_{11}H_5O_2$ (percent): C, 25.5; F, 63.3; H, 1.6. Found (percent): C, 24.9; F, 62.6; H, 1.6.

Sixty-six parts of the alcohol prepared as above and 35 parts of toluene-2,4-diisocyanate were charged to a vessel followed by the addition of one part of triethylamine catalyst. An exotherm resulted and the temperature rose to 123° C. after which the mixture was cooled to 85–90° C. and held for four hours. The product was recrystallized from methyl chloroform. The product was an isomeric mixture, and major proportion of which was 2-isocyanato - 4 - (4 - heptafluoroisopropoxy-3,3,4,4-tetrafluorobutyl)toluene carbamate having the structure

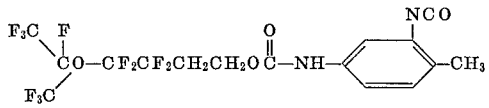

The product had a melting point of 67–70° C. The structure was confirmed by infrared analysis which showed an isocyanate absorption at 4.41 microns and carbonyl absorption at 5.75 microns.

*Elemental analysis.*—Calculated for $C_{16}F_{11}H_{11}N_2O_4$ (percent): C, 38.1; F, 41.5; H, 2.2; N, 5.6. Found (percent): C, 37.6; F, 42.0; H, 2.2; N, 5.2.

EXAMPLE 2

Sixty parts of the alcohol as prepared in Example 1 and 12.5 parts of toluene-2,4-diisocyanate were admixed and one part of triethylamine catalyst added slowly. The temperature rose to 93° C. The mixture was maintained at 35° C. overnight. The product was recrystallized from methyl chloroform.

Bis[4 - (heptafluoroisopropoxy) - 3,3,4,4 - tetrafluorobutyl]toluene-2,4-dicarbamate having the structure

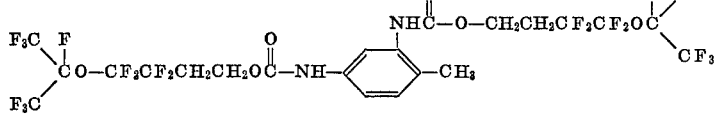

was recovered having a melting point of 60–61° C. The structure was confirmed by infrared analysis which showed a carbonyl absorption at 5.75 microns.

*Elemental analysis.*—Calculated for $C_{23}F_{22}H_{16}O_6N_2$ (percent): C, 33.1; F, 50.2; H, 1.9; N, 3.4. Found (percent): C, 33.6; F, 50.4; H, 2.0; N, 3.6.

EXAMPLE 3

A mixture of 34.8 parts of toluene-2,4-diisocyanate and a catalytic amount of triethylamine was charged to a vessel and 66 parts of 4-heptafluoroisopropoxy-3,3,4,4-tetrafluorobutyl alcohol as prepared in Example 1 were added slowly. The solution was heated at 100° C. for one hour and 54 parts of octadecyl alcohol were added slowly. The reaction mixture was maintained at 130° C. for two hours.

The product (153 parts) was mainly 2-octadecyl 4-(4-heptafluoroisopropoxy - 3,3,4,4 - tetrafluorobutyl)toluene-2,4-dicarbamate having the structure

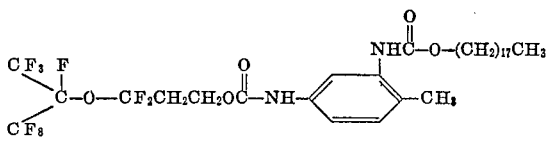

which was confirmed by infrared analysis. The product was a white, crystalline solid having a melting point of 45–50° C.

*Elemental analysis.*—Calculated for $C_{34}F_{11}H_{49}N_2O_5$ (percent): C, 52.7; F, 27.0; H, 6.3. Found (percent): C, 51.9; F, 27.4; H, 6.3.

EXAMPLE 4

A mixture of 125 parts by volume of anhydrous acetone, 12.2 parts of toluene-2,4-diisocyanate, and a small amount of triethylamine was charged to a vessel and 23 parts of 4-hepta-fluoroisopropoxy-3,3,4,4-tetrafluorobutyl alcohol were added slowly maintaining the temperature at 40° C. Three parts of ethyleneimine were added and the mixture maintained at 40° C. for one-half hour.

The main product was 2-aziridinyl-4-(4-heptafluoroisopropoxy - 3,3,4,4 - tetrafluorobutyl)toluene - 2,4 - dicarbamate having the structure

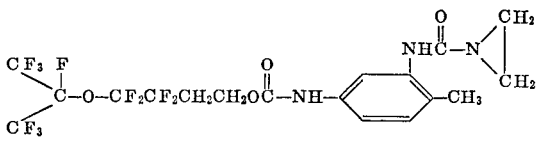

which was confirmed by infrared analysis.

*Elemental analysis.*—Calculated for $C_{18}F_{15}H_{11}O_4N_2$ (percent): C, 39.4; F, 38.3; H, 2.9. Found (percent): C, 39.8; F, 39.0; H, 2.8.

EXAMPLE 5

One hundred parts of 6-heptafluoroisopropoxy-3,3,4,4-5,5,6,6-octafluoro-1-hexyl iodide were added to a vessel containing 200 parts of 20% oleum preheated to 90° C. The reaction mixture was stirred at 100° C. for one hour and cooled to room temperature. 840 parts of water were added slowly while the reaction temperature rose to 70° C. The mixture was heated at 100° C. for 16 hours. The mixture was washed with sodium thiosulfate solution to remove any elemental iodine and the oily product was recovered, dried and distilled.

A 63% yield (50.2 parts) of 6-heptafluoroisopropoxy-3,3,4,4,5,5,6,6 - octafluoro - 1 - hexanol were obtained having a boiling point of 63° C./4 mm.

*Elemental analysis.*—Calculated for $C_9F_{15}H_5O_2$ (percent): C, 25.1; F, 66.3; H, 1.2. Found (percent): C, 24.5; F, 66.4; H, 1.2.

Toluene - 2,4 - diisocyanate (5.7 parts) and 5 drops of triethylamine were charged to a vessel and 14 parts of the alcohol prepared as above were added slowly. The reaction temperature rose to 50° C. The mixture was heated at 80° C. for two hours and cooled.

2 - isocyanato - 4 - (6 - heptafluoroisopropoxy-3,3,4,4,5,5,6,6-octafluorohexyl)toluene carbamate (20.5 parts) was the major product having the structure

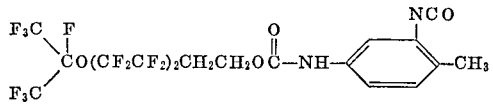

The product was a yellow, crystalline solid having a melting point of 108–110° C. The structure was confirmed by infrared analysis which showed an isocyanate absorption at 4.41 microns and a carbonyl absorption at 5.75 microns.

*Elemental analysis.*—Calculated for $C_{18}F_{15}H_{11}O_4N_2$ (percent): C, 35.8; F, 47.2; H, 1.8; N, 4.6. Found (percent): C, 36.2; F, 48.1; H, 2.0; N, 4.9.

EXAMPLE 6

Toluene-2,4-diisocyanate (2.85 parts) and 5 drops of triethylamine were stirred in a vessel and 14 parts of the alcohol prepared in Example 3 were added slowly. The mixture was heated to 80° C. and cooled.

Bis(6 - heptafluoroisopropoxy - 3,3,4,4,5,5,6, - octafluorohexyl)toluene-2,4-dicarbamate having the structure

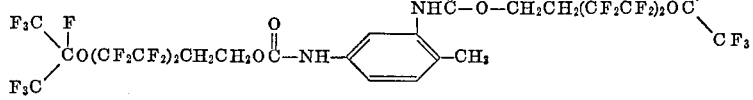

was recovered as a light yellow crystalline product having a melting point of 74–76° C. The structure was confirmed by infrared analysis.

*Elemental analysis.*—Calculated for $C_{27}F_{30}H_{12}O_6N_2$ (percent): C, 31.5; F, 55.1; H, 1.6; N, 2.7. Found (percent): C, 30.7; F, 56.0; H, 1.9; N, 2.5.

EXAMPLE 7

One thousand five parts of 20% oleum were charged to a vessel and 615 parts of 8-heptafluoroisopropoxy-3,3,4,4,5,5,6,6,7,7,8,8-dodecafluoro-1-octyliodide were added over a period of 1.5 hours while maintaing the temperature at about 95–100° C. The mixture was stirred at 95–100° C. an additional 1.5 hours. 2200 parts of water containing 145 parts of sodium thiosulfate were added to effect hydrolysis and remove iodine. The mixture was heated at 100° C. for one hour. After cooling, the mixture was taken up in ether, dried, and the ether flashed off. The oily residue was distilled.

A 72.5% yield of 8-heptafluoroisopropoxy-3,3,4,4,5,5,6,6,7,7,8,8-dodecafluoro-1-octanol was recovered having a boiling point of 80–82° C./4 mm.

Elemental analysis was as follows:

Calculated for $C_{11}F_{19}H_5O_2$ (percent): C, 24.9; F, 68.1; H, 0.9. Found (percent): C, 25.0; F, 68.5; H, 1.1.

Toluene-2,4-diisocyanate (3.7 parts) and 5 drops of triethylamine were stirred together and 14.8 parts of the alcohol prepared above were added slowly. The reaction temperature rose to 60° C. and the mixture was heated at 90° C. for 1 hour and cooled.

The major portion of the product (18 parts) was 2-isocyanto - 4-(8-heptafluoroisopropoxy-3,3,4,4,5,5,6,6,7,7,8,8-dodecafluorooctyl)toluene carbamate having the structure

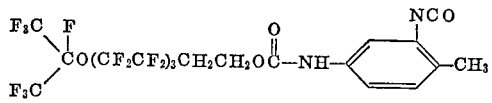

The product was a light yellow crystalline solid having a melting point of 89–90° C. The structure was confirmed by infrared analysis which showed an isocyanate absorption at 4.41 microns and carbonyl absorption at 5.75 microns.

*Elemental analysis.*—Calculated for $C_{20}F_{19}H_{11}O_4N_2$ (percent): C, 34.1; F, 51.3; H, 1.6; N, 4.0. Found (percent): C, 35.1; F, 50.9; H, 1.8; N, 4.2.

EXAMPLE 8

Toluene-2,4-diisocyanate (1.85 parts) and five drops of triethylamine were stirred together. 14.8 parts of the alcohol prepared in Example 5 were added slowly. The reaction mixture was held at 90° C. for one hour and cooled.

Bis 8 - (heptafluoroisopropoxy)-3,3,4,4,5,5,6,6,7,7,8,8-dodecafluorooctyl toluene-2,4-dicarbamate (15.5 parts) having the structure

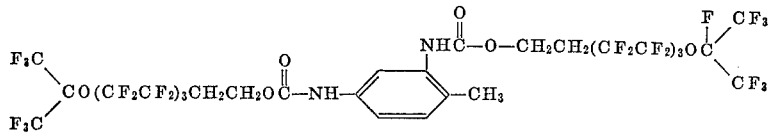

were recovered as a light colored solid having a melting point of 76–78° C. The structure was confirmed by infrared analysis.

*Elemental analysis.*—Calculated for $C_{31}F_{38}H_{16}O_6N_2$ (percent): C, 30.0; F, 58.9; H, 1.3; N, 2.2. Found (percent): C, 29.3; F, 57.9; H, 1.5; N, 2.5.

EXAMPLE 9

A slurry was prepared for 62 parts of lithium aluminum hydride and 750 parts of anhydrous ether. 500 parts of 10-iodo-13-heptafluoroisopropoxy-12,12,13,13-tetrafluoro-1-tridecanol in 250 parts of petroleum ether were added slowly so as to maintain a slight reflux. Reflux was continued overnight and the mixture was cooled. Water was added to decompose excess lithium aluminum hydride and the mixture was made acid with 25% sulfuric acid. The oily layer was distilled.

A 67% yield of 182 parts of 13-heptafluoroisopropoxy-12,12,13,13-tetrafluoro-tridecanol was recovered having a boiling point of 92–95° C./4 mm.

*Elemental analysis.*—Calculated for $C_{16}F_{11}H_{23}O_2$ (percent): C, 42.1; F, 45.8; H, 5.0. Found (percent): C, 43.0; F, 46.1; H, 5.5.

7.5 parts of the alcohol as above were added slowly to a mixture of 1.43 parts of toluene-2,4-diisocyanate and 0.2 part of triethylamine. The mixture was heated to 70° C. and cooled.

Bis[13-(heptafluoroisopropoxy)-12,12,13,13-tetrafluoro-tridecyl] toluene-2,4-dicarbamate having the structure

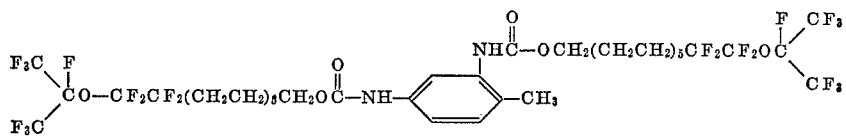

was recovered as a crystalline solid.

*Elemental analysis.*—Calculated for $C_{41}F_{22}H_{52}O_6N_2$ (percent): C, 45.6; F, 38.4; H, 4.8; N, 2.8. Found (percent): C, 47.2; F, 39.2; H, 5.0; N, 2.9.

EXAMPLE 10

Nineteen parts of the alcohol as in Example 1 were added to a mixture of 6.7 parts of phenylisocyanate and 0.1 part of triethylamine. The mixture was reacted at 80° C. for 1 hour. The product was recrystallized from methyl chloroform.

(4 - heptafluoroisopropoxy - 3,3,4,4-tetrafluoro-butyl)-phenylcarbamate having the structure

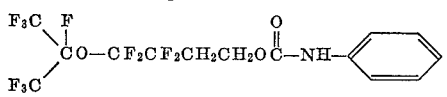

was recovered having a melting point of 42–44° C.

*Elemental analysis.*—Calculated for $C_{14}F_{11}H_{10}O_3N$ (percent): C, 37.5; F, 46.7; H, 2.2; N, 3.1. Found (percent): C, 38.1; F, 47.1; H, 2.2; N, 3.0.

EXAMPLE 11

Thirty parts of the alcohol as in Example 1 were added to a mixture of 26.8 parts of octadecylisocyanate and one part of triethylamine. The mixture was heated at 90° C. for 3 hours.

(4 - heptafluoroisopropoxy-3,3,4,4-tetrafluorobutyl)-octadecyl carbamate having the formula

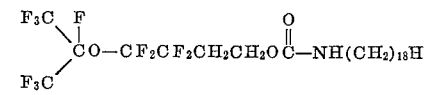

was recovered having a melting point of 56–58° C.

*Elemental analysis.*—Calculated for $C_{26}F_{11}H_{42}O_3N$ (percent): C, 50.0; F, 33.4; H, 5.9; N, 2.2. Found (percent): C, 51.0; F, 32.9; H, 6.1; N, 2.2.

EXAMPLE 12

Thirty parts of the alcohol as in Example 1, 15.3 parts of 1,6-diisocyanatohexane and 0.1 part of triethylamine were admixed and heated at 95° C. for 3 hours. The liquid product was recovered.

The structure for 1-isocyanato-6-(4-heptafluoroisopropoxy-3,3,4,4-tetrafluorobutyl)hexyl carbamate

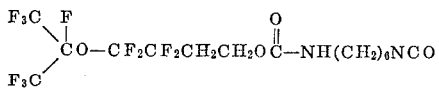

was confirmed by elemental analysis as follows:

Calculated for $C_{15}F_{11}H_{17}O_4N_2$ (percent): C, 36.1; F, 42.0; H, 3.4; N, 5.6. Found (percent): C, 37.1; F, 42.2; H, 3.7; N, 5.8.

EXAMPLE 13

The product obtained in Example 12 was further reacted with an additional 30 parts of the alcohol of Example 1 at 90° C. for one hour. The solid product was recrystallized from methyl chloroform.

Bis(4 - heptafluoroisopropoxy-3,3,4,4-tetrafluorobutyl)-hexane-1,6-dicarbamate having the structure

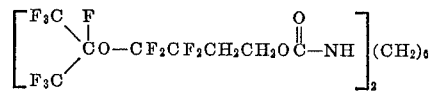

was recovered having a melting point of 43–44° C.

*Elemental analysis.*—Calculated for $C_{14}F_{22}H_{22}O_6N_2$ (percent): C, 31.9; F, 50.5; H, 3.7; N, 3.4. Found (percent): C, 32.1; F, 52.2; H, 3.8; N, 3.8.

The compositions of the invention impart oil and water repellency to a wide range of substrates, including fibers, textiles, leather, wood, metals, glass and the like. The compositions of the invention can be applied by well-known methods, as by spraying, coating, dipping, padding, brushing and the like from an organic solution or from aqueous dispersions. The compositions are particularly effective when coated on the surface of a suitable substrate in an amount of from 0.001 to about 5%, preferably from about 0.1 to about 2%, by weight of the fluorocarbamate based on the weight of the article to be treated. The fluorocarbamate based on the weight of the article to be treated. The fluorocarbamates of the invention can be employed alone or in combination with other known water repellents such as paraffin wax, octadecyl isocyanate, etc. They can also be employed in conjunction with other known fabric treating agents which impart crease resistance, soil resistance and the like. In addition to their excellent water and oil repellency properties, the compositions of the invention exhibit surface active properties and reduce the surface tension of water or aqueous solutions.

The compounds of the invention were tested as textile treating agents. Oil repellency was determined according to the method described on pages 323-4 of the April 1962 edition of the Textile Research Journal. According to this procedure, drops of mixtures of mineral oil and n-heptane in varying proportions are gently placed on the treated fabric and are allowed to stand for three minutes. At this time the wetting and penetration by the drops on the fabric is observed. The number corresponding to the mixture containing the highest percentage of heptane which does not penetrate or wet the fabric is taken as the oil repellency of the treated fabric. A rating of 90 or higher is considered excellent.

Water repellency was determined according to AATCC test method 22–1952.

EXAMPLE 14

Solutions of the carbamate of Example 1 and the dicarbamate of Example 2 were mixed with 2% of a solvent soluble water repellent composed of paraffin waxes and combining agents sold by Crown Chemical Co. Samples of cotton cloth and worsted gabardine wool were padded with the solutions and passed through a squeeze roll to remove excess solution (100% pickup). The treated samples were dried in air for 45 minutes and then in an oven at 125° C. for 4 minutes and at 165° C. for 2 minutes.

Oil and water repellency was tested before and after successive standard washing cycles. A standard washing cycle consists of agitating the treated fabric for 15 minutes at 70–80° C. in water containing 0.2% by weight of a heavy duty detergent, rinsing with boiling water, then cold water, and ironing at 235° F.

The results are summarized below.

weighed. The water absorption is determined according to the following equation:

$$\text{Percent water abs.} = 100 \times \frac{W_2 - W_1}{W_1}$$

The spray rating is determined according to ASTM test D 583–54.

The oil repellency rating is determined by placing drops of mixtures of mineral oil and n-heptane on the leather. The composition containing the highest percentage of n-heptane which does not wet the leather under the drop is the oil repellency rating. The scale used is given below.

| Oil repellency rating: | Percent-n-heptane |
|---|---|
| 100 | 50 |
| 90 | 40 |
| 80 | 30 |
| 70 | 20 |
| 60 | 10 |
| 50 | 0 |
| 0 | (1) |

[1] No holdout to oil.

The static oil absorption is determined in similar manner to the water absorption test except that the leather is immersed in the oil to a depth of ¼ inch, and the piece is removed after 10 minutes.

Resistance to hydrochloric acid is determined by placing a [4" x ½"] sample of the leather to be tested on a smooth horizontal surface and weighing one end for one inch. 37% hydrochloric acid is applied along a strip ⅛" x ¼" of the remaining portion 1½" from the unweighted end. The amount of rise or curl of the leather after 5 minutes is measured in degrees.

Caustic resistance is determined by applying 5 drops of 10 M NaOH preheated to 100° C. to the surface. After 5 minutes, the leather is rinsed and dried. The area under the NaOH drops is examined and reported as: no effect, slight stain, slight burn, severe burn or hole.

The leather employed in the tests is first chrome tanned, retanned with vegetable extracts or syntans, colored, fat liquored according to conventional procedures for tanning and dyeing leathers, treated internally from aqueous solution with a fluorocarbon acid chromium complex and air dried.

| Carbamate compound | Fabric | Concentration, percent | Oil repellency Initial | Oil repellency Four washings | Water repellency Initial | Water repellency One washing |
|---|---|---|---|---|---|---|
| Example 1 | Cotton | 0.5 | 120 | 130 | 90 | 90– |
|  | do | 1.0 | 130 | 130 | 90 | 90– |
|  | Wool | 0.5 | 120 | 120 | 90 | 90– |
|  | do | 1.0 | 120 | 100 | 90 | 90– |
| Example 2 | Cotton | 0.5 | 100 | 60 | 70+ | 0 |
|  | do | 1.0 | 120 | 70 | 70+ | 0 |
|  | Wool | 0.5 | 120 | 130 | 80+ | 80 |
|  | do | 1.0 | 120 | 110 | 80+ | 80+ |
| Example 3 | Cotton | 1.0 | 110 |  |  |  |

Thus the compounds of the invention impart excellent oil and water repellency to fabrics with good durability to successive laundering cycles. Unexpectedly, the monocarbamates, as shown by Example 1, which contain less fluorine and thus would be expected to show poorer oil and water repellency properties, are equal to or more effective initially than the dicarbamates and are more resistant to laundering.

The compounds of the invention were tested as leather treating agents according to the following tests: Static water absorption is determined by immersing a 2" x 2" piece of the leather to be tested in water to a depth of one inch for one hour. The specimen can be kept below the surface by weighted hooks or by hooks held to a magnet. The surface water is blotted off and the sample is re-

EXAMPLE 15

The carbamates prepared in Examples 1 and 2 were tested as leather treating agents to improve the surface repellency of leathers treated as described above and then sueded by buffing with #80 sandpaper. Since the buffing operation necessary in finishing the fluorochemically treated suede-type leathers reduces the surface water and oil repellency, the carbamates are used as a top coating to restore these properties. The pigskin suede leather was topcoated by dipping into 2.0% solutions of a mono- and dicarbamate of the invention in 1,1,1-trichloroethane for 15 minutes and air drying. The results are given below wherein the controls were not topcoated, Sample A was topcoated with the carbamate of Example 1 and Sample B was topcoated with the dicarbamate of Example 2.

Thus, the compounds of the invention imparted increased oil and water repellency to leathers treated with a prior art repellent.

As will be known to one skilled in the art, other compounds according to the present invention can be applied in analogous fashion to substrates such as fabrics, leather, paper and the like to impart oil and water resistance thereto.

Further compounds illustrative of the invention are prepared in similar manner substituting the appropriate starting materials.

|  | Sample A | Sample B | Unsueded control | Sueded control |
|---|---|---|---|---|
| Static water absorption, percent | 19.5 | 21.6 | 67.2 | 53.0 |
| Spray rating | 90 | 80–90 | 100 | 80 |
| Static oil absorption, percent | 9.8 | 24.1 | 45.4 | 58.8 |
| Oil repellency rating | 110 | <50 | <50 | <50 |
| HCl resistance, degrees | <5 | 5 | 5 | 5 |
| Caustic resistance | (1) | (2) | (2) | (2) |

[1] Very slight stain.
[2] No stain.

| Example | Fluoroalcohol reactant | Isocyanate reactant | Product |
|---|---|---|---|
| Example 16 | ClCF$_2$CF(CF$_3$)OCF$_2$CF$_2$CH$_2$CH$_2$OH | 2,4-toluene diisocyanate | ClCF$_2$CF(CF$_3$)OCF$_2$CF$_2$CH$_2$CH$_2$OC(O)NH–C$_6$H$_3$(CH$_3$)–NCO |
| Example 17 | CF$_3$CF$_2$CF(CF$_3$)OCF$_2$CF$_2$CH$_2$CH$_2$OH | 2,4-toluene diisocyanate | CF$_3$CF$_2$CF(CF$_3$)OCF$_2$CF$_2$CH$_2$CH$_2$OC(O)NH–C$_6$H$_3$(CH$_3$)–NCO |
| Example 18 | CF$_3$CF$_2$CF(CF$_3$)OCF$_2$CF$_2$CH$_2$CH$_2$OH | phenyl isocyanate | CF$_3$CF$_2$CF(CF$_3$)OCF$_2$CF$_2$CH$_2$CH$_2$OC(O)NH–C$_6$H$_5$ |
| Example 19 | [OCF$_2$CF(CF$_3$)]$_2$O(CF$_2$CF$_2$)$_3$CH$_2$CH$_2$OH | OCN(CH$_2$)$_6$NCO | [OCF$_2$CF(CF$_3$)]$_2$O(CF$_2$CF$_2$)$_3$CH$_2$CH$_2$OC(O)NH–(CH$_2$)$_6$–NCO |
| Example 20 | CF$_3$CF(CF$_3$)O(CF$_2$CF$_2$)$_3$CH$_2$CH$_2$OH | 2,4-toluene diisocyanate | CF$_3$CF(CF$_3$)O(CF$_2$CF$_2$)$_3$CH$_2$CH$_2$OC(O)NH–C$_6$H$_3$(CH$_3$)–NCO |
| Example 21 | CF$_3$CF(CF$_3$)O(CF$_2$CF$_2$)$_4$(CH$_2$CH$_2$)$_4$OH | 4-chlorophenyl isocyanate | CF$_3$CF(CF$_3$)O(CF$_2$CF$_2$)$_4$(CH$_2$CH$_2$)$_4$OC(O)NH–C$_6$H$_4$–Cl |
| Example 22 | CF$_3$CF(CF$_3$)O(CF$_2$CF$_2$)$_2$CH$_2$CH$_2$OH | 4,4′-dicyclohexylmethane diisocyanate | [CF$_3$CF(CF$_3$)O(CF$_2$CF$_2$)$_2$CH$_2$CH$_2$OC(O)NH]$_2$–(C$_6$H$_{10}$)$_2$ |

It will be apparent that numerous modifications and variations can be effected without departing from the novel concepts of the present invention and the illustrative details disclosed are not to be construed as imposing undue limitations on the invention.

We claim:

1. A compound having the formula

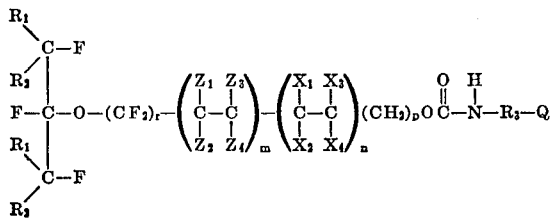

wherein $R_1$ and $R_2$ independently at each occurrence can be fluorine, chlorine, perfluoroalkyl and together can form a cyclic perfluoroalkylene group with the proviso that $R_1$ and $R_2$ cannot both be chlorine; $Z_1$, $Z_2$, $Z_3$ and $Z_4$ independently can be fluorine, chlorine or hydrogen with the proviso that no more than two of $Z_1$–$Z_4$ are chlorine; $X_1$, $X_2$, $X_3$ and $X_4$ independently can be fluorine, chlorine or hydrogen with the proviso that no more than one of $X_1$–$X_4$ is chlorine; $r$ is an integer from 1–2; $m$ and $n$ are integers from 0–75; the sum of $m$ and $n$ is 0–75; $p$ is an integer from 0–1 with the proviso that when $p$ is 0, $n$ must be at least one and $X_3$ and $X_4$ must be hydrogen; $R_3$ is the divalent residue of an aromatic, alicyclic or aliphatic hydrocarbon or halogenated hydrocarbon isocyanate and Q is hydrogen, a radical of the formula

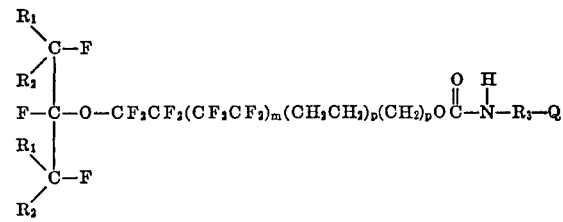

wherein $R_1$, $R_2$, $Z_1$–$Z_4$, $X_1$–$X_4$, $r$, $m$, $n$ and $p$ have the meanings given above, an isocyanate radical or a carbamate radical.

2. A compound according to claim 1 wherein $m$ and $n$ are integers from 0–10.

3. A compound according to claim 1 wherein said compound has the formula

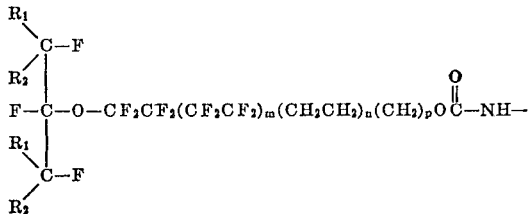

wherein $R_1$ and $R_2$ independently are fluorine or perfluoroalkyl of 1–2 carbon atoms; $m$ and $n$ are integers of 0–10, $p$ and $R_3$ have the aforesaid meanings and Q is an isocyanate radical, a carbamate radical or a radical of the formula

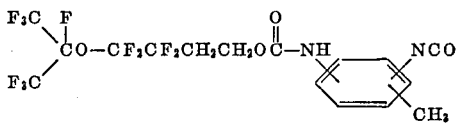

wherein $R_1$, $R_2$, $m$, $n$ and $p$, have the aforesaid meanings.

4. A compound according to claim 3 wherein $R_3$ is tolylene.

5. A compound according to claim 3 having the formula

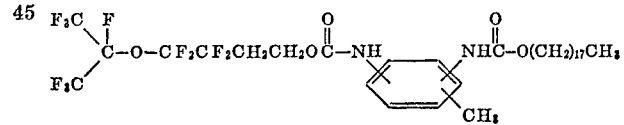

6. A compound according to claim 3 having the formula

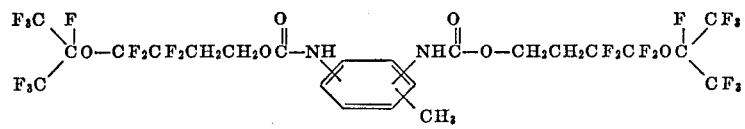

7. A compound according to claim 3 having the formula

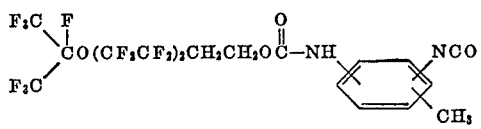

8. A compound according to claim 3 having the formula

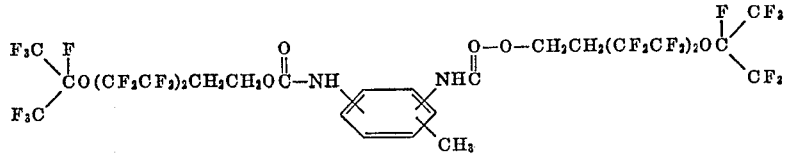

9. A compound according to claim 3 having the formula

10. A compound according to claim 3 having the formula
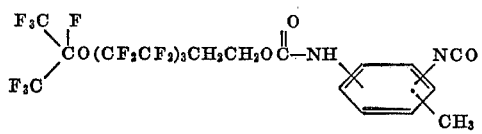
11. A compound according to claim 3 having the formula
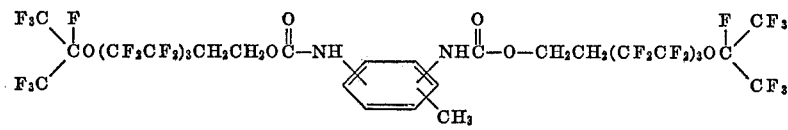
12. A compound according to claim 3 having the formula
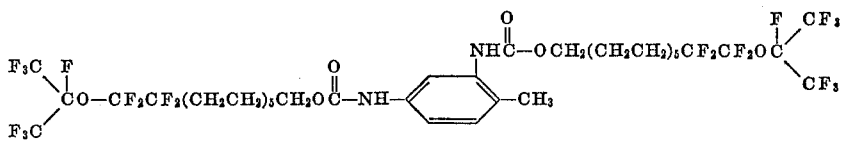
13. A compound according to claim 3 having the formula
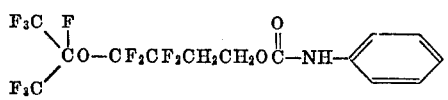
References Cited
UNITED STATES PATENTS
3,341,608   9/1967   Hauptschein et al. ____ 260—471
LORRAINE A. WEINBERGER, Primary Examiner
L. A. THAXTON, Assistant Examiner
U.S. Cl. X.R.
117—139.5 CQ, 145; 260—239 E, 404, 468 C, 482 B, 482 C

UNITED STATES PATENT OFFICE
CERTIFICATE OF CORRECTION

Patent No. __3,657,320__    Dated __April 18, 1972__

Inventor(s) __Louis G. Anello and Richard F. Sweeney__  —1—

It is certified that error appears in the above-identified patent and that said Letters Patent are hereby corrected as shown below:

Col. 6, line 23 - "and" should read -- the --;

Col. 7, first formula - that part which reads

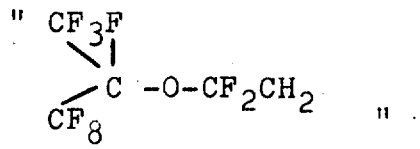

should read

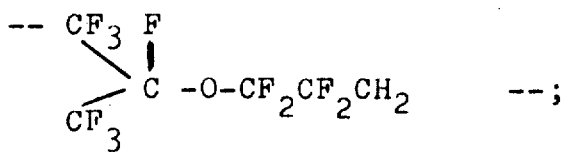

Col. 7, line 42 - "$C_{18}F_{15}H_{11}O_4N_2$" should read

-- $C_{18}F_{11}H_{16}N_3O_4$ --;

Col. 9, first formula - that part which reads

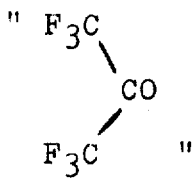   should read   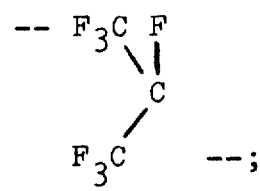

Col. 9, line 42 - "part" should read -- parts --;

UNITED STATES PATENT OFFICE
CERTIFICATE OF CORRECTION

Patent No. 3,657,320      Dated April 18, 1972

Inventor(s) Louis G. Anello and Richard F. Sweeney

It is certified that error appears in the above-identified patent and that said Letters Patent are hereby corrected as shown below:

Col. 11, In the table under Example 2, 4th. column -

```
   "70+                        -- 70+
    70+      should read          70
    80+                           80+
    80+ "                         80+   --;
```

Col. 12, line 37 - "10 M" should read -- 10 $\underline{M}$ --;

Col. 11, line 3, cancel "The fluoro-"; cancel line 4.

Col. 14, In the table under Col. 3, 4th formula, that part which reads

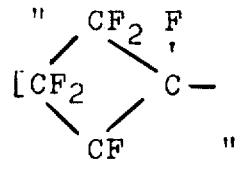 should read 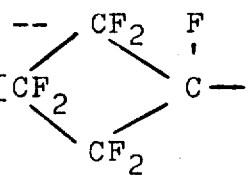 --;

Page 3

UNITED STATES PATENT OFFICE
CERTIFICATE OF CORRECTION

Patent No. 3,657,320　　　　　　　　Dated April 18, 1972

Inventor(s) Louis G. Anello and Richard F. Sweeney

It is certified that error appears in the above-identified patent and that said Letters Patent are hereby corrected as shown below:

Col. 15, 3rd. formula - that part which reads

"$(CH_2CH_2)_p$" should read -- $(CH_2CH_2)_n$ --;

Col. 16, last formula - that part which reads

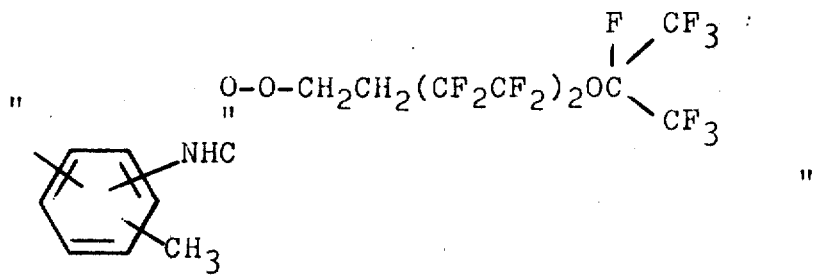

should read

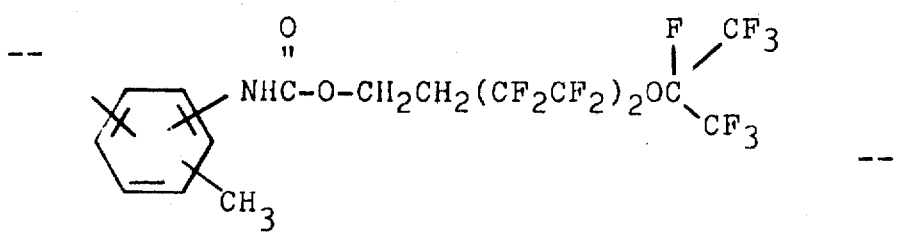

Signed and sealed this 20th day of August 1974.

(SEAL)
Attest:

McCOY M. GIBSON, JR.　　　　　　　　C. MARSHALL DANN
Attesting Officer　　　　　　　　　　Commissioner of Patents